United States Patent [19]

Mullen

[11] 4,260,656

[45] Apr. 7, 1981

[54] PIN-FEED LABEL STOCK FOR DRIVE TRANSPORT SYSTEMS AND METHOD OF FORMING SAME

[75] Inventor: James W. Mullen, Walnut Creek, Calif.

[73] Assignee: VIDAC, Concord, Calif.

[21] Appl. No.: 941,027

[22] Filed: Sep. 11, 1978

[51] Int. Cl.[3] .......................... B32B 3/10; B32B 3/16; B32B 31/18

[52] U.S. Cl. ...................................... 428/42; 156/253; 156/270; 428/56; 428/137; 428/138

[58] Field of Search ....................... 428/40, 41, 43, 42, 428/131, 138, 906, 54–56, 132, 137; 156/250, 253, 268, 269, 270, 252, 257, 344, 510; 101/66, 288

[56] References Cited

U.S. PATENT DOCUMENTS

| | | | |
|---|---|---|---|
| 2,789,640 | 4/1957 | Belden | 156/517 |
| 3,783,083 | 1/1974 | Jenkins | 428/43 |
| 3,846,218 | 5/1974 | Wootten | 156/252 |
| 4,041,863 | 8/1977 | Mullen et al. | 101/288 |
| 4,121,004 | 10/1978 | Ehrlund | 428/43 |

*Primary Examiner*—William J. Van Balen
*Attorney, Agent, or Firm*—Joseph L. Strabala

[57] ABSTRACT

A paper stock adapted to be employed in transport systems utilizing projecting pin-type sprocket drives includes at least one row of a plurality of spaced-apart and aligned pin-engageable drive apertures extending the length thereof, each of which drive apertures is formed by a partially open circular die-cut line having a gap between its ends of approximately 0.010 inches to 0.040 inches, the gap being oriented at the leading edge of the resulting aperture, thereby forming a strengthening hinge-like connection between the paper stock and the aperture blank when such blank is subsequently displaced, such as by engagement with a projecting pin on a drive sprocket mechanism of a transport system used to move paper stock through a machine.

18 Claims, 10 Drawing Figures

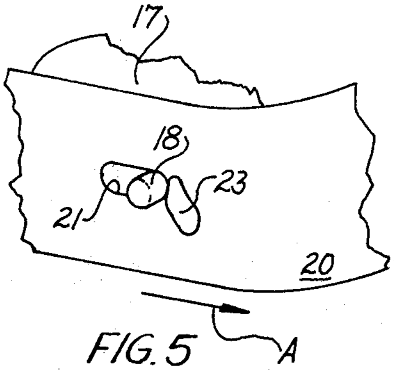
FIG. 5
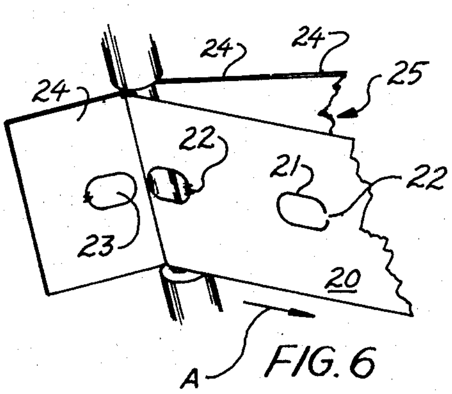
FIG. 6
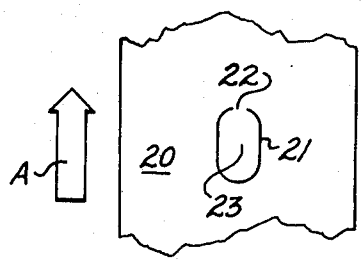
FIG. 7
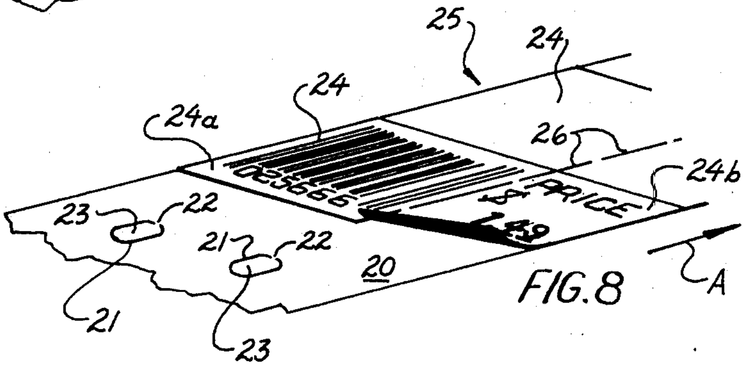
FIG. 8
FIG. 9
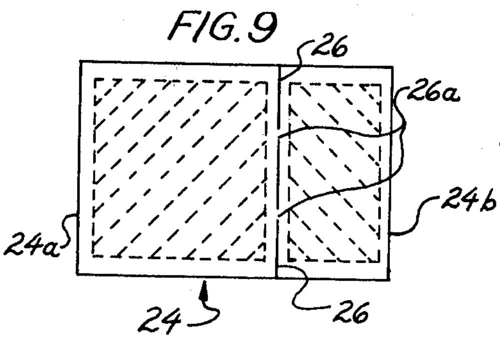
FIG. 10
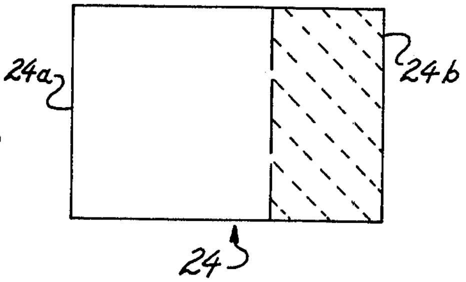

PIN-FEED LABEL STOCK FOR DRIVE TRANSPORT SYSTEMS AND METHOD OF FORMING SAME

BACKGROUND OF THE INVENTION

Various types of machines employ paper stocks or paper tapes which are transported through the machine utilizing pin-type drives which are engaged in apertures in the paper stock or tape to move it through the machine. A common machine of this type is the conventional computer printed which employs a series of aligned pre-punched holes along each edge of the paper stock, allowing pins projecting from drive sprockets on opposite sides of the printing mechanism to be received in these holes and transport the paper stock positively through the printer. This type of drive obviously eliminates paper slippage and ensures an incremental and positive advance of the paper through the machine. Further, once the paper stock is aligned, the paper stock remains straight as it feeds through the machine and also is maintained in a timed relationship with the printing mechanism so that there is no overprinting of lines one on the other.

Of course, computer printers are by no means the only devices which utilize pin-type drives or transports to positively advance paper stocks therein. For example, labeling devices commonly use pin-type drive transports to incrementally advance and dispense printed labels which are applied to articles to be marked with product or price information. In such devices, a two-layer tape is used, one layer forming the discrete labels and the other forming a backing strip which is used to advance discrete labels in a timed relationship into the printing mechanism and subsequently to advance to the printed label to a position where it can be dispensed.

Normally, label stocks of this type have discrete labels which have an adhesive surface faced against a backing strip so that after the label is printed and the backing strip is advanced, the discrete labels will be released from the backing strip and can be "wiped on" an article requiring price information or product information, such as the Universal Product Code. For information on the latter, see "UPC Symbol Specification", January, 1975, published by Distribution Codes, Inc., 401 Wythe Street, Alexandria, Virginia.

In conventional label stocks, the individual or discrete labels are adhered to the back of the strip, which usually includes a release coating such as a silicone composition, so that the individual labels will easily peel from the backing strip. In many labeling devices, this is accomplished by constructing the label stock of relatively stiff paper and routing the backing strip over a small roller with a sharp change in direction so that label will automatically peel away from the backing strip as the latter passes over the small roller and changes its direction due to stiffness of the label stock. It can be appreciated that for both the printing operations and the dispensing operations, it is necessary that the label stock, and thus the backing strip, be positively advanced in the device in specific increments in order that the label will be in the proper position to print product code or price information, and subsequently advance properly to cause it to peel away from the backing strip, exposing its adhesive surface so that it can be "wiped on" an article requiring the price or product code information.

Due to the necessity for positive and specific incremental advancement of label stocks in labeling devices, the backing strip of stock usually includes pin-type drive apertures which can be engaged by a drive sprocket with projecting pins which are received in the apertures to move the label stock through the unit. U.S. Pat. No. 4,041,863, owned by this assignee, shows a labeling device employing a typical pin-drive sprocket in its transport system and also illustrates the prior art labeling stocks that have been used in such devices.

As is shown in the referenced patent, the prior art backing strip of the label stock included a plurality of die-cut U-shaped apertures thereon that received pins therein on a drive sprocket to transport the backing strip through the device. As the backing strip passes over the drive-sprocket, the pins thereon will be received in the U-shaped aperture and displace the paper blank within the confines of the die-cut forming the aperture. In such die-cut backing strips, it has often been the practice to leave a small web or neck of the backing strip at the apex of the semi-circular portion of the U-shaped die-cut to prevent the paper blank from sticking to the label when it peels away. If the paper blank within such an aperture aggressively sticks to the label, it can cause the backing strip to tear and can obviously rip the backing strip and eliminate subsequent drive apertures, or alternatively, cause the backing strip to separate completely, requiring the operator to re-thread the unit. To reduce the frequency of the blanks' separation from the backing strip, a small web is used to secure the apex of the U-shaped blank. This, however, has not proven satisfactory.

While this invention is intended primarily to correct the problems such as described above in label stocks, it can also be used in other paper stocks utilizing pin-type drive transports. For example, in paper stocks for computer printers which normally use such drives, the holes are completely punched out, eliminating the blanks in these apertures. However, utilizing this invention, it is possible to leave the paper blanks associated with the aperture, thereby eliminating a good deal of paper chaff which would otherwise result when the blanks within the apertures are fully punched out.

In some devices, this chaff from paper stocks utilizing pin-type drives have caused various machine malfunctions, and thus these also could be eliminated if the current invention is applied to such paper stocks.

Also, this invention allows the use of inexpensive dies because it is not necessary for the edges of the cutting die to engage an anvil to completely sever the blank nor to punch out the resulting paper blank. As a result, the die-cutting edges last longer, resulting in further economies.

SUMMARY OF THE INVENTION

The above advantages can be accomplished by a paper stock which is suitable for use in pin-type paper transport systems wherein the paper stock includes a longitudinal paper strip having at least one row of a plurality of spaced-apart and aligned pin-engageable drive apertures extending the length thereof, each of which drive apertures is formed by a generally circular die-cut line having a gap between its converging ends of approximately 0.040 inches, said gap located at the leading edge of each said aperture to form a strengthened pin-engaging area when the resulting paper blank within such aperture is hingedly displaced by the entry of a pin into such drive aperture for driving engagement with the leading edge of said paper strip. The above-referenced paper stock can be formed by fabricating a longitudinal strip of paper stock, processing said paper stock through a die-cutting machine arranged to sequentially bring dies into pressure-engagement with said paper strip, and forming the cutting dies in said die-cutting machine with a circular cutting edge having a gap between its converging ends and controlling them to apply sufficient pressure when said dies come into contact with said paper strip that the strip is substantially separated along the cutting edge of said dies when they engage said paper strip.

BRIEF DESCRIPTION OF THE DRAWINGS

The invention will be better understood with reference to the attached drawings in conjunction with the following written description, which together illustrate and describe a preferred embodiment of the invention, and wherein:

FIG. 5 is an enlarged perspective illustrating the pin-engagement of the backing strip shown in FIG. 4 as it passes over the drive sprocket.

FIG. 6 is an enlarged perspective of the label stock shown in FIG. 4 and made according to this invention illustrating that the paper blank of the drive aperture according to this invention when pulled free of the backing strip due to the aggressiveness of the adhesive on the label will not rip the backing strip or interfere with the pin-type drive transport.

FIG. 7 is an enlarged plan view of a paper stock having drive apertures in accordance with the teachings of this invention.

FIG. 8 is a perspective of a label stock formed according to this invention having dual rows of drive apertures and a split label configuration for both product and price information; and FIGS. 9 and 10 are enlarged plan views of the labels of the label stock shown in FIG. 8.

DESCRIPTION OF A PREFERRED EMBODIMENT

Figure 1:
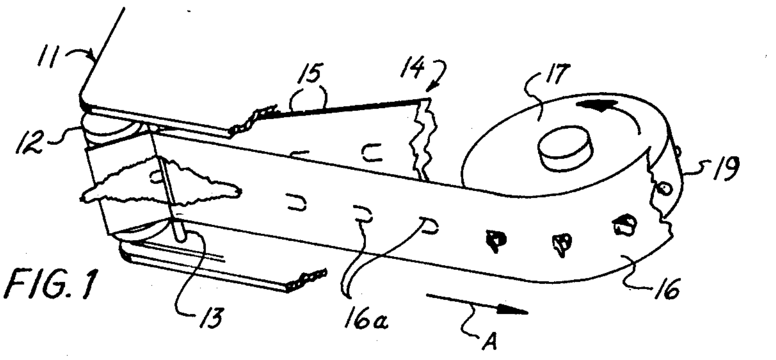
FIG. 1 is a perspective of a labeling device with parts broken away to show the printing and drive arrangement for prior art label stocks employing pin-type drive transports.
Figure 2:
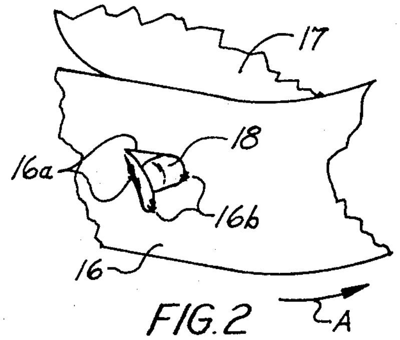
FIG. 2 is a broken-away perspective of a part of FIG. 1 illustrating the engagement of a pin on the drive sprocket of a transport system engaging the backing strip of a prior art label stock.
Figure 3:
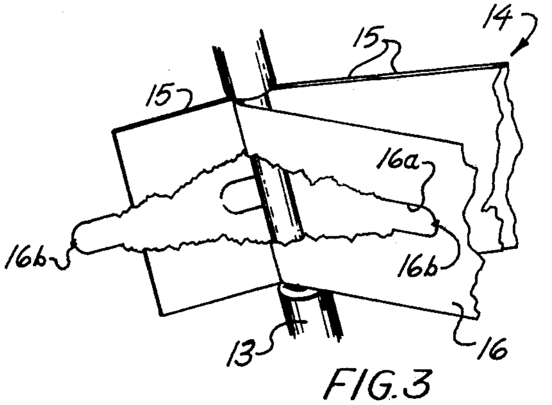
FIG. 3 is a perspective of the prior art label stock threaded over a roller illustrating how the backing strip having prior art-type drive apertures can be torn if the paper blank within the aperture sticks to the label when separation occurs due to the aggressiveness of the adhesive on the label.

To better understand this invention, reference is made to FIGS. 1, 2, and 3, showing a prior art pin feed paper stock, and more specifically, a label stock having a backing strip utilizing U-shaped drive apertures employed in labeling devices to incrementally advance the label stock. As can be seen in FIG. 1, a typical labeling device 11 is shown which includes an applicator roller 12 and an adjacent, small diameter reversing roller 13, sometimes referred to in the trade as a peel idler. A label stock 14 (from a source not shown) having a plurality of discrete labels 15 and a backing strip 16 is threaded in the labeling devices as shown, so that the backing strip is routed from the reversing roller over a capstan drive sprocket 17 having a plurality of projecting drive pins 18 on its outer cylindrical surface 19. These pins are received in the U-shaped apertures formed by die-cuts **16*a* to incrementally pull the backing strip through the unit. As these pins engage the apertures, they "punch out" the paper blank of the aperture as shown in FIG. 2. When this occurs, a small web 16*b* of paper, having a width of approximately 0.017 of an inch or wider at the apex of the U-shaped aperture is separated by the ingress of the pin into the aperture as shown in FIG. 2**. The more aggressive the adhesive, the wider the web.

This small neck or web **16*b* of paper is left at the apex of the U-shaped aperture when the die-cutting operation is accomplished. Its purpose is to prevent the paper blank of the aperture from sticking to the adhesively coated labels 15 when they are "peeled off" of the backing strip 16 as it reverses over roller 13 (See FIG. 3). While typically these backing strips have their surfaces coated with a release agent where the labels are adhered thereto, such as a silicone compound, the adhesive is sometimes so aggressive due to temperature, humidity and/or formulation variations that it will cause the web 16*b* to break, allowing the paper blank of the aperture to adhere to the label. Often when this occurs, the backing strip 16 will be ripped or torn as shown in FIGS. 1 and 3. As a result, the backing strip may be parted or damaged to the extent that the capstan drive sprocket 17 will be unable to properly advance the label stock in precise incremental steps. Of course, when this occurs, the labels will not be properly positioned in the unit for printing, nor for subsequent dispensing from the applicator roller 12, as shown in FIG. 1**. Obviously, the discrete labels must be properly positioned in the printing mechanism in order for the proper information to be printed thereon; otherwise, the labels will be useless and illegible.

Additional problems can occur in a backing strip with the U-shaped aperture, especially if the webs **16*b* do not separate cleanly since breaking these webs weakens the backing strip in the area where the pins 18 on the drive sprocket 17** apply the greatest driving force. Obviously, if the backing strip tears in this area of the aperture, the successive pins will not align with the apertures and the label stock again will not be advanced in precise incremental manner.

Figure 4:
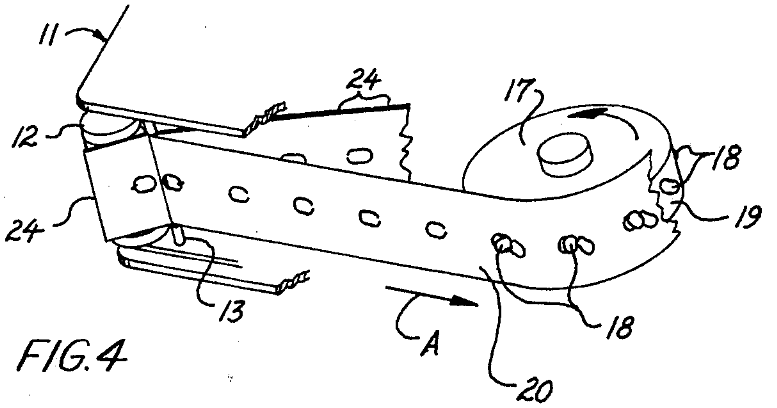
FIG. 4 is a perspective similar to FIG. 1, but illustrating a label stock made according to this invention in which circular die-cuts with gaps are used as opposed to prior art U-shaped die-cuts previously used on the backing strip that is used to pull the label stock through a device with a pin-type transport system.

The above difficulties can be overcome by this invention which utilizes the backing strip 20 illustrated in FIGS. 4, 5, and 7. More specifically, it is illustrated as a single, open, circular die-cut **16*a* in a backing strip employing a small web or tab 16*b*** to prevent the paper blank from being carried with the label when it is peeled off the backing strip. According to this invention, the open, circular die-cut employed leaves a small gap of paper stock from 0.010 to 0.040 inches between its open ends so that the resulting small neck or web of paper forms a hinge for the resulting circular blank. Further, the web forming the hinge is oriented so that it is at the leading edge of the aperture, i.e., the leading edge being related to the direction of travel of the backing strip through the labeling devices, so that each pin will engage a stronger uncut portion of the circular portion of an aperture to advance the backing strip.

More specifically, as shown in FIGS. 4, 5, and 7, each aperture in the backing strip 20 includes a single, open, circular die-cut which is employed rather than the previously utilized U-shaped die-cuts with the tear-away tab 16*b* described above. As indicated, there is a small gap between the open end of the circular die-cut leaving a resulting circular paper blank connected to the paper stock with a web 22 having a width of from 0.010 to 0.040 inches, as is best shown in FIG. 7. This small neck or web is preferably in the range of 0.040 inches, as best shown in FIG. 7, and forms a hinge for the resulting circular blank 23, which is left in the central portion of the aperture during the die-cutting operation. Further, the orientation of the hinge is important, since if it were on the trailing edge of each aperture in the backing strip, it would rip the trailing edge of each aperture in the backing strip, which can ultimately cause the backing strip to separate longitudinally or cause other problems in the pin drive of this strip.

This backing strip, according to this invention, also includes discrete labels 24, as shown best in FIG. 8, and forms therewith a label stock 25 for labeling devices. Normally, this label stock is formed of a backing strip and a label stock strip adhered together in a laminate, as shown in the drawings. Usually the label stock strip adhered to the backing tape is continuous and is subsequently routed through a die-cutting operation to form both the discrete labels and the apertures in the backing strip. For this reason, it is undesirable to use techniques which punch out the apertures, which would of course be unacceptable, since it would perforate the labels as well. Obviously, if the blanks in the aperture are fully cut free of the backing strip and not removed, they will adhere to the label stock when it separates as individual labels. Of course, to preform apertures to eliminate the blanks in the backing strip raises problems relative to the drive and label spacing.

Located on backing strip 20 are individual discrete labels 24 (best shown in FIG. 8). These labels and backing strips therewith form the new label stock 25 of this invention, which is normally stored in rolls after the die-cutting operation described above.

This label stock 25 can be threaded through a labeling device 11 as shown in FIG. 4. It can be seen in this figure that the label stock proceeds from a source (not shown) through the labeling device, and that the backing strip 20 is threaded over a reversing roller 13 and extends to a capstan drive sprocket 17 having projecting pins 18 which engage the backing strip by entering the drive apertures formed by the circular die-cut lines 21.

Normally, when a pin 18 engages a paper blank 23 formed in the backing strip 20, it will displace the blank, as shown in FIG. 4, causing it to "hinge" away from the pin on the small web portion 22 connecting it to the backing strip. Since the paper stock is not "torn or parted" in the area of the hinge, the engagement of the pin along the hinge line is in a strengthened area in the backing strip which is better able to transmit the drive forces from the pin to the backing strip without tearing the former. Further, if the adhesive holding the labels on the backing strip is aggressive, it will, in some cases, cause the small web 22 connecting blank 23 to the backing strip to part or separate as shown in FIG. 6. However, if this occurs, it will not rip or tear the backing strip longitudinally, as often occurred in the prior art label stock described in reference to FIGS. 1 and 3. Further, since only the small blank 23 will separate from the backing strip, its presence on the adhesive surface of the label will not normally interfere with the label's attachment to an article to be marked with the coded information on the label. Of course, when larger portions of the backing strip separated under these conditions in prior art label stock, it could and often did interfere with the label's adhesive attachment to an article to be marked.

FIG. 7 shows the new backing strip in plan and it can be seen that the die-cut line 21 is illustrated as an oblong circle or oval having a slight opening or gap which forms web 22. Obviously, this die-cut line could be completely circular in configuration, if desired. Furthermore, its shape is somewhat dependent upon the length of the driving pins received in these apertures, since the shorter the pin, the less oblong the configuration of the circular die-cut. Of course, it is also related to the diameter of the drive sprocket on which the pins are located. More importantly, it is sufficient, according to this invention, if the die-cut line 21 is substantially circular as described above.

In addition to the label stock 25 described above, it can be appreciated that the backing strip of any label stock formed according to this invention could have two parallel rows of apertures such as shown in FIG. 8. Obviously, the purpose of two rows of apertures is to increase the driving surface against which the pins 18 can engage the backing strip. This is particularly useful in wider labels, since it tends to keep the label stock aligned as it is pulled through the dispensing and printing mechanisms and, of course, provide more bearing surface to distribute the forces because wider labels require more force to separate them from the backing strip and to transport the material through the device.

The label stock 25 illustrated in FIGS. 8, 9 and 10 has two parts, 24(*a*) and 24(*b*), which are respectively a label portion for U.P.C. code information and a label portion for price information both printed thereon by the label device. If desired, the price label portion 24(*b*) can be separated from the U.P.C. label portion 24(*a*) along the die-cut line 26, which completely separates these two labels except for small webs 26(*a*) that connect them. This is best shown in FIG. 9, and from the details therein, it can be appreciated that if the price information is not desired, that portion of the label can be separately removed from the article to which the label has been applied without disturbing the label portion thereof having the U.P.C. code information. Often the part of the label stock having the price information is "half coated" to facilitate its release from the article.

This arrangement in the label stock according to this invention increases the flexibility thereof when used in supermarkets or other high-volume merchandising operations wherein the price of the merchandise can vary from time to time.

To form this new label stock 25, a sandwich of a continuous strip of label stock is adhesively mated with an equal length of a coated backing strip to form a laminate. Initially, neither the discrete labels nor the apertures are present in the respective strips when the laminate is formed. Thereafter, if necessary, this laminate is trimmed to strips of the proper width and then processed through a die-cutting machine.

In the die-cutting machine, dies having sharpened edges are brought into pressure contact or engagement with both the top and bottom surfaces of the laminate, thereby cutting the respective edges of the dies. As a result of the edge configuration of these dies, discrete labels will be formed in the label stock strip and drive apertures will be simultaneously formed in the backing strip. Of course, the dies are timed so that there will be position correspondence between the discrete labels 24 and the drive apertures formed in the backing strip 20, thereby ensuring proper timed relationships when the label stock 25 is dispensed in a suitable labeling device.

The cutting edges of all the dies are adjusted so the particular strip that they engage will be substantially severed (separated) in the configuration of the cutting edges of the die by the pressure engagement, but in a manner that the other strip of the laminate will not be so cut. This ensures that the discrete labels will properly separate from one another when the labels are dispensed and also that the apertures will not be substantially cut into the surfaces of the labels by the die-cutting machine. Likewise, the dies which form the discrete labels and separate the two portions of label 24 will not cut the backing strip and weaken it so that it cannot perform its function in the labeling unit of advancing the labels.

The machines for effecting such die-cutting operations are fairly conventional and the process of making the instant label stock requires that the edges of the dies conform with the die-cut lines illustrated in the drawings, particularly FIGS. 4 through 10.

Generally paper stocks for forming labels and backing strips are well known in the art. They are usually formed of fibrous material. Paper stock suitable for labels tends to be somewhat thicker and stiffer than the paper stock used for forming the backing strip. Also, as previously indicated, the paper stock used for backing strips is usually coated so that the adhesive holding the label stock to the backing strip will separate therefrom.

In the die cutting operations, it is sufficient that the die cutting step forming the pin drive apertures substantially separates the paper stock along the cutting edge.

I claim:

1. A paper stock with a plurality of individual adhesive labels on a supporting backing strip for use with pin-type drives in paper transport systems and backing strip comprising a longitudinal paper-like strip having at least one aligned row of spaced-apart pin-engageable drive apertures, each drive aperture having a displaceable blank closing it, and each drive aperture formed by a continuous circular die cut line having a gap between its converging ends with said gap connecting the resulting blank at its leading edge with said strip, each of said continuous circular die cut lines substantially severing its resulting blank from said strip in its drive aperture except in the area of said gap operable to prevent tearing of said backing strip should any blank fail to properly release from its associates adhesive label when the latter peels from said backing strip and operable to allow said blank to be easily displaced, whereby displacement of said blank in said aperture will cause it to hinge along the gap.

2. The paper stock defined in claim 1 wherein the gap between the converging ends of the die-cut line is from 0.010 to 0.040 inches.

3. The paper stock defined in claim 1 wherein the aligned row of drive apertures is oriented parallel to the longitudinal axis of the strip.

4. The paper stock defined in claim 1 wherein the gap between the converging ends of the die-cut line in each aperture is centrally located at the leading edge of its drive aperture whereby displacement of the blank will cause it to hinge about the gap, forming a strengthened pin engaging area.

5. A paper stock defined in claim 1 wherein the die-cut line is circular.

6. The paper stock defined in claim 1 wherein the paper stock has at least two aligned rows of spaced-apart pin engageable drive apertures.

7. The paper stock defined in claim 1 wherein the paper stock forms a backing strip for a label stock adhesively held on said paper stock.

8. The paper stock defined in claim 7 wherein the label stock has two separate parts for each label.

9. A paper stock with a plurality of individual adhesive labels on a supporting backing strip suitable for a pin-type paper transport system said backing strip comprising a longitudinal paper strip having at least one row of a plurality of spaced-apart pin-engageable drive apertures, each said aperture formed by an open continuous circular die cut line having a gap between its ends leaving a resulting blank in said aperture connected to said strip at its leading edge by a hinge-like web of said paper strip, each of said continuous circular die cut lines substantially severing its resulting blank from said strip in its drive aperture except in the area of said gap operable to prevent tearing of said backing strip should any blank fail to properly release from its associated adhesive label when the latter peels from said backing strip and operable to allow said blank to be easily displaced, thereby allowing said resulting blank to remain connected to said paper strip when displaced by a pin in the drive of a transport system.

10. The paper stock defined in claim 9 wherein the web of the paper strip has a width from 0.010 to 0.040 inches.

11. The paper stock defined in claim 10 wherein the circular die-cut line substantially severs the resulting blank from the paper strip in each drive aperture except for the web, thereby enabling it to be easily displaced from the aperture.

12. The paper stock defined in claim 11 wherein the web connecting the resulting blank with its drive aperture is centrally located at the leading edge of the aperture whereby displacement of said blank will cause it to hinge about said web, forming a strengthened pin engaging area.

13. The paper stock defined in claim 9 wherein the paper stock forms a backing strip for a label stock composed of multiple sequentially-aligned labels adhesively held on said paper stock.

14. A method of forming a paper stock having laminated strips of label stock adhesively secured to a backing strip adapted to be transported in a pin-type drive system comprising impressing on said backing strip of said paper stock at a plurality of aligned spaced locations a cutting die, said cutting die having an open continuous circular cutting edge with a small gap from 0.010 to 0.040 inches between the ends of said cutting edge with said cutting die being controlled so that it is impressed on said paper stock with sufficient force to cause its cutting edge to substantially separate said backing strip in conformity with said cutting edge, thereby forming a resulting connected circular blank capable of easy separation along the resulting cut and which will separate with an adhesive label formed by transverse die cuts if the latter fails to properly release without tearing said backing strip.

15. A method of making a label stock having a backing strip with discrete labels adhered thereto suitable for labeling devices capable of printing information on the discrete labels and dispensing them, comprising:

(a) applying a suitable adhesive layer to one side of a first paper stock, said first paper stock suitable for forming discrete labels;

(b) combining said first paper stock in overlapped relationship with a second paper stock to form a laminate with the adhesive layer against said second paper stock, said second paper stock being suitable for forming a backing strip for transporting said discrete labels through a labeling device, and to release said discrete labels therefrom during dispensing of the printed labels;

(c) die-cutting said first paper stock of said laminate with suitable dies having straight cutting edges to convert said first paper stock of said laminate into discrete labels without severing said second paper stock of said laminate; and (d) die-cutting said second paper stock of said laminate with cutting dies, each cutting die having an open continuous circular cutting edge with a small gap from 0.010 to 0.040 inches between the converging ends of said cutting edge, said die cutting controlled to form at least one aligned row of a plurality of spaced-apart pin drive apertures in said second paper stock, each of which apertures is closed by a pin displaceable and hingedly-connected blank, each of said continuous circular die cut lines substantially severing its resulting blank from said strip in its driving aperture except in the area of said gap at the leading edge of said blank each resulting blank will separate with its associated label if it fails to release therefrom without tearing said backing strip and operable to allow said blank to be easily displaced.

16. The method defined in claim 15 wherein a step is added which includes splitting laminate into elongated strips.

17. The method defined in claim 15 wherein the discrete labels formed in the first paper stock are further divided in the die cutting step so that each label is composed of two parts.

18. The method defined in claim 15 wherein the second paper stock is die-cut to substantially separate said second paper stock of said laminate.

* * * * *